(12) United States Patent
Krantz et al.

(10) Patent No.: US 7,757,009 B2
(45) Date of Patent: Jul. 13, 2010

(54) STORAGE CONTROLLERS WITH DYNAMIC WWN STORAGE MODULES AND METHODS FOR MANAGING DATA AND CONNECTIONS BETWEEN A HOST AND A STORAGE DEVICE

(75) Inventors: Leon A. Krantz, Mission Viejo, CA (US); Kha Nguyen, Anaheim, CA (US); Michael J. North, Orange, CA (US)

(73) Assignee: Marvell International Ltd., Hamilton (BM)

( * ) Notice: Subject to any disclaimer, the term of this patent is extended or adjusted under 35 U.S.C. 154(b) by 840 days.

(21) Appl. No.: 10/894,144

(22) Filed: Jul. 19, 2004

(65) Prior Publication Data

US 2006/0015654 A1 Jan. 19, 2006

(51) Int. Cl.
*G06F 3/00* (2006.01)
(52) U.S. Cl. .................. 710/6; 710/4; 710/5; 710/9; 710/26; 711/4; 711/202; 711/205; 709/242
(58) Field of Classification Search ............... 710/6
See application file for complete search history.

(56) References Cited

U.S. PATENT DOCUMENTS

| | | |
|---|---|---|
| 3,800,281 A | 3/1974 | Devore et al. |
| 3,988,716 A | 10/1976 | Fletcher et al. |
| 4,001,883 A | 1/1977 | Strout et al. |
| 4,016,368 A | 4/1977 | Apple, Jr. |
| 4,050,097 A | 9/1977 | Miu et al. |
| 4,080,649 A | 3/1978 | Calle et al. |
| 4,156,867 A | 5/1979 | Bench et al. |
| 4,225,960 A | 9/1980 | Masters |
| 4,275,457 A | 6/1981 | Leighou et al. |
| 4,390,969 A | 6/1983 | Hayes |
| 4,451,898 A | 5/1984 | Palermo et al. |
| 4,486,750 A | 12/1984 | Aoki |

(Continued)

FOREIGN PATENT DOCUMENTS

EP 0528273 2/1993

(Continued)

OTHER PUBLICATIONS

PCT International Search Report, Doc. No. PCT/US00/15084, Dated Nov. 15, 2000, 2 Pages.

(Continued)

*Primary Examiner*—Niketa I Patel
*Assistant Examiner*—Brooke J Dews

(57) ABSTRACT

A method and system for transferring data between a host and a Serial Attached Small Computer Interface ("SAS") device using a storage controller is provided. The storage controller includes, a World Wide Name ("WWN") module that includes a table having plural entries, wherein each row includes a WWN address, an initiator tag value field, an input/output counter value that tracks plural commands for a connection. A WWN index value represents the address of a row having plural entries. The method includes, comparing frame elements of incoming frames, including a unique WWN address with the WWN module entries; and if there is a match, updating a counter value for a connection between the storage controller and a device sending frames. The counter value is increased when a command frame is received and decreased when a command is executed and a response is sent to the device.

39 Claims, 10 Drawing Sheets

U.S. PATENT DOCUMENTS

| | | |
|---|---|---|
| 4,500,926 A | 2/1985 | Yoshimaru et al. |
| 4,587,609 A | 5/1986 | Boudreau et al. |
| 4,603,382 A | 7/1986 | Cole |
| 4,625,321 A | 11/1986 | Pechar et al. |
| 4,667,286 A | 5/1987 | Young et al. |
| 4,777,635 A | 10/1988 | Glover |
| 4,805,046 A | 2/1989 | Kuroki et al. |
| 4,807,116 A | 2/1989 | Katzman et al. |
| 4,807,253 A | 2/1989 | Hagenauer et al. |
| 4,809,091 A | 2/1989 | Miyazawa et al. |
| 4,811,282 A | 3/1989 | Masina |
| 4,812,769 A | 3/1989 | Agoston |
| 4,860,333 A | 8/1989 | Bitzinger et al. |
| 4,866,606 A | 9/1989 | Kopetz |
| 4,881,232 A | 11/1989 | Sako et al. |
| 4,920,535 A | 4/1990 | Watanabe et al. |
| 4,949,342 A | 8/1990 | Shimbo et al. |
| 4,970,418 A | 11/1990 | Masterson |
| 4,972,417 A | 11/1990 | Sako et al. |
| 4,975,915 A | 12/1990 | Sako et al. |
| 4,989,190 A | 1/1991 | Kuroe et al. |
| 5,014,186 A | 5/1991 | Chisholm |
| 5,023,612 A | 6/1991 | Liu |
| 5,027,357 A | 6/1991 | Yu et al. |
| 5,050,013 A | 9/1991 | Holsinger |
| 5,051,998 A | 9/1991 | Murai et al. |
| 5,068,755 A | 11/1991 | Hamilton et al. |
| 5,068,857 A | 11/1991 | Yoshida |
| 5,072,420 A | 12/1991 | Conley et al. |
| 5,088,093 A | 2/1992 | Storch et al. |
| 5,109,500 A | 4/1992 | Iseki et al. |
| 5,117,442 A | 5/1992 | Hall |
| 5,127,098 A | 6/1992 | Rosenthal et al. |
| 5,133,062 A | 7/1992 | Joshi et al. |
| 5,136,592 A | 8/1992 | Weng |
| 5,146,585 A | 9/1992 | Smith, III |
| 5,157,669 A | 10/1992 | Yu et al. |
| 5,162,954 A | 11/1992 | Miller et al. |
| 5,193,197 A | 3/1993 | Thacker |
| 5,204,859 A | 4/1993 | Paesler et al. |
| 5,218,564 A | 6/1993 | Haines et al. |
| 5,220,569 A | 6/1993 | Hartness |
| 5,237,593 A | 8/1993 | Fisher et al. |
| 5,243,471 A | 9/1993 | Shinn |
| 5,249,271 A | 9/1993 | Hopkinson |
| 5,257,143 A | 10/1993 | Zangenehpour |
| 5,261,081 A | 11/1993 | White et al. |
| 5,271,018 A | 12/1993 | Chan |
| 5,274,509 A | 12/1993 | Buch |
| 5,276,564 A | 1/1994 | Hessing et al. |
| 5,276,662 A | 1/1994 | Shaver, Jr. et al. |
| 5,276,807 A | 1/1994 | Kodama et al. |
| 5,280,488 A | 1/1994 | Glover et al. |
| 5,285,327 A | 2/1994 | Hetzler |
| 5,285,451 A | 2/1994 | Henson et al. |
| 5,301,333 A | 4/1994 | Lee |
| 5,307,216 A | 4/1994 | Cook et al. |
| 5,315,708 A | 5/1994 | Eidler et al. |
| 5,339,443 A | 8/1994 | Lockwood |
| 5,361,266 A | 11/1994 | Kodama et al. |
| 5,361,267 A | 11/1994 | Godiwala et al. |
| 5,408,644 A | 4/1995 | Schneider et al. |
| 5,420,984 A | 5/1995 | Good et al. |
| 5,428,627 A | 6/1995 | Gupta |
| 5,440,751 A | 8/1995 | Santeler et al. |
| 5,465,343 A | 11/1995 | Henson et al. |
| 5,487,170 A | 1/1996 | Bass et al. |
| 5,488,688 A | 1/1996 | Gonzales et al. |
| 5,491,701 A | 2/1996 | Zook |
| 5,500,848 A | 3/1996 | Best et al. |
| 5,506,989 A | 4/1996 | Boldt et al. |
| 5,507,005 A | 4/1996 | Kojima et al. |
| 5,519,837 A | 5/1996 | Tran |
| 5,523,903 A | 6/1996 | Hetzler et al. |
| 5,544,180 A | 8/1996 | Gupta |
| 5,544,346 A | 8/1996 | Amini |
| 5,546,545 A | 8/1996 | Rich |
| 5,546,548 A | 8/1996 | Chen et al. |
| 5,563,896 A | 10/1996 | Nakaguchi |
| 5,572,148 A | 11/1996 | Lytle et al. |
| 5,574,867 A | 11/1996 | Khaira |
| 5,581,715 A | 12/1996 | Verinsky et al. |
| 5,583,999 A | 12/1996 | Sato et al. |
| 5,592,404 A | 1/1997 | Zook |
| 5,600,662 A | 2/1997 | Zook et al. |
| 5,602,857 A | 2/1997 | Zook et al. |
| 5,615,190 A | 3/1997 | Best et al. |
| 5,623,672 A | 4/1997 | Popat |
| 5,626,949 A | 5/1997 | Blauer et al. |
| 5,627,695 A | 5/1997 | Prins et al. |
| 5,640,602 A | 6/1997 | Takase |
| 5,649,230 A | 7/1997 | Lentz |
| 5,664,121 A | 9/1997 | Cerauskis |
| 5,689,656 A | 11/1997 | Baden et al. |
| 5,691,994 A | 11/1997 | Acosta et al. |
| 5,692,135 A | 11/1997 | Alvarez, II et al. |
| 5,692,165 A | 11/1997 | Jeddeloh et al. |
| 5,719,516 A | 2/1998 | Sharpe-Geisler |
| 5,729,718 A | 3/1998 | Au |
| 5,740,466 A | 4/1998 | Geldman |
| 5,745,793 A | 4/1998 | Atsatt et al. |
| 5,754,759 A | 5/1998 | Clarke et al. |
| 5,758,188 A | 5/1998 | Applebaum et al. |
| 5,784,569 A | 7/1998 | Miller et al. |
| 5,794,073 A | 8/1998 | Ramakrishnan et al. |
| 5,801,998 A | 9/1998 | Choi |
| 5,818,886 A | 10/1998 | Castle |
| 5,822,142 A | 10/1998 | Hicken |
| 5,831,922 A | 11/1998 | Choi |
| 5,835,930 A | 11/1998 | Dobbek |
| 5,841,722 A | 11/1998 | Willenz |
| 5,844,844 A | 12/1998 | Bauer et al. |
| 5,850,422 A | 12/1998 | Chen |
| 5,854,918 A | 12/1998 | Baxter |
| 5,890,207 A | 3/1999 | Sne et al. |
| 5,890,210 A | 3/1999 | Ishii et al. |
| 5,907,717 A | 5/1999 | Ellis |
| 5,912,906 A | 6/1999 | Wu et al. |
| 5,925,135 A | 7/1999 | Trieu et al. |
| 5,937,435 A | 8/1999 | Dobbek et al. |
| 5,950,223 A | 9/1999 | Chiang et al. |
| 5,968,180 A | 10/1999 | Baco |
| 5,983,293 A | 11/1999 | Murakami |
| 5,991,911 A | 11/1999 | Zook |
| 6,029,226 A | 2/2000 | Ellis et al. |
| 6,029,250 A | 2/2000 | Keeth |
| 6,041,417 A | 3/2000 | Hammond et al. |
| 6,052,797 A * | 4/2000 | Ofek et al. ..................... 714/6 |
| 6,065,053 A | 5/2000 | Nouri et al. |
| 6,067,206 A | 5/2000 | Hull et al. |
| 6,070,200 A | 5/2000 | Gates et al. |
| 6,078,447 A | 6/2000 | Sim |
| 6,081,849 A | 6/2000 | Born et al. |
| 6,092,231 A | 7/2000 | Sze |
| 6,094,320 A | 7/2000 | Ahn |
| 6,124,994 A | 9/2000 | Malone, Sr. |
| 6,134,063 A | 10/2000 | Weston-Lewis et al. |
| 6,157,984 A | 12/2000 | Fisher |
| 6,178,486 B1 | 1/2001 | Gill et al. |
| 6,192,499 B1 | 2/2001 | Yang |
| 6,201,655 B1 | 3/2001 | Watanabe et al. |
| 6,223,303 B1 | 4/2001 | Billings et al. |
| 6,279,089 B1 | 8/2001 | Schibilla et al. |
| 6,297,926 B1 | 10/2001 | Ahn |

| | | |
|---|---|---|
| 6,330,626 B1 | 12/2001 | Dennin et al. |
| 6,381,659 B2 | 4/2002 | Proch et al. |
| 6,401,149 B1 | 6/2002 | Dennin et al. |
| 6,421,711 B1 * | 7/2002 | Blumenau et al. ........... 709/213 |
| 6,470,461 B1 | 10/2002 | Pinvidic et al. |
| 6,487,631 B2 | 11/2002 | Dickinson et al. |
| 6,490,635 B1 | 12/2002 | Holmes |
| 6,530,000 B1 | 3/2003 | Krantz et al. |
| 6,574,676 B1 | 6/2003 | Megiddo |
| 6,606,695 B2 * | 8/2003 | Kamano et al. ............. 711/163 |
| 6,662,334 B1 | 12/2003 | Stenfort |
| 6,826,650 B1 | 11/2004 | Krantz et al. |
| 6,952,743 B2 * | 10/2005 | Ortega et al. .................... 710/5 |
| 6,957,279 B2 * | 10/2005 | Odenwald et al. .............. 710/1 |
| 7,359,380 B1 * | 4/2008 | Maufer et al. ............... 370/392 |
| 2001/0044873 A1 | 11/2001 | Wilson et al. |
| 2002/0138618 A1 * | 9/2002 | Szabo ........................ 709/225 |
| 2002/0161951 A1 * | 10/2002 | Allen et al. ................. 710/106 |
| 2003/0004981 A1 * | 1/2003 | Kaneda et al. ............. 707/204 |
| 2003/0037225 A1 | 2/2003 | Deng et al. |
| 2004/0085994 A1 * | 5/2004 | Warren et al. ............... 370/462 |
| 2005/0097271 A1 * | 5/2005 | Davies et al. ............... 711/114 |
| 2005/0111378 A1 * | 5/2005 | Chen et al. ................. 370/252 |
| 2007/0016716 A1 * | 1/2007 | Nemoto et al. ................. 711/2 |

FOREIGN PATENT DOCUMENTS

| | | |
|---|---|---|
| EP | 0622726 | 11/1994 |
| EP | 0718827 | 6/1996 |
| GB | 2285166 | 6/1995 |
| JP | 63-292462 | 11/1988 |
| JP | 01-315071 | 12/1989 |
| JP | 03183067 | 8/1991 |
| WO | 98/14861 | 4/1998 |

OTHER PUBLICATIONS

Blathut R. Digital Transmission of Information (Dec. 4, 1990), pp. 429-430.

Hwang, Kai and Briggs, Faye A., "Computer Architecture and Parallel Processing" pp. 156-164.

Zeidman, Bob, "Interleaving DRAMS for Faster access", System Design ASIC & EDA, pp. 24-34 (Nov. 1993).

P.M. Bland et. al. Shared Storage Bus Circuitry, IBM Technical Disclosure Bulletin, vol. 25, No. 4, Sep. 1982, pp. 2223-2224.

PCT search report for PCT/US00/07780 mailed Aug. 2, 2000, 4 Pages.

* cited by examiner

STORAGE CONTROLLERS WITH DYNAMIC WWN STORAGE MODULES AND METHODS FOR MANAGING DATA AND CONNECTIONS BETWEEN A HOST AND A STORAGE DEVICE

BACKGROUND OF THE INVENTION

1. Field of the Invention

The present invention relates generally to storage device controllers, and more particularly, to efficiently managing data flow using a WWN module.

2. Background

Conventional computer systems typically include several functional components. These components may include a central processing unit (CPU), main memory, input/output ("I/O") devices, and streaming storage devices (for example, tape drives/disks) (referred to herein as "storage device").

In conventional systems, the main memory is coupled to the CPU via a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system.

The storage device is coupled to the host system via a controller that handles complex details of interfacing the storage device to the host system. Communications between the host system and the controller is usually provided using one of a variety of standard I/O bus interfaces.

Typically, when data is read from a storage device, a host system sends a read command to the controller, which stores the read command into a buffer memory. Data is read from the device and stored in the buffer memory.

Various standard interfaces are used to move data from host systems to storage devices. Fibre channel is one such standard. Fibre channel (incorporated herein by reference in its entirety) is an American National Standard Institute (ANSI) set of standards, which provides a serial transmission protocol for storage and network protocols such as HIPPI, SCSI, IP, ATM and others. Fibre channel provides an input/output interface to meet the requirements of both channel and network users.

Host systems often communicate with storage systems using the standard "PCI" bus interface. PCI stands for Peripheral Component Interconnect, a local bus standard that was developed by Intel Corporation®. The PCI standard is incorporated herein by reference in its entirety. Most modern computing systems include a PCI bus in addition to a more general expansion bus (e.g. the ISA bus). PCI is a 64-bit bus and can run at clock speeds of 33 or 66 MHz.

PCI-X is a standard bus that is compatible with existing PCI cards using the PCI bus. PCI-X improves the data transfer rate of PCI from 132 MBps to as much as 1 GBps. The PCI-X standard (incorporated herein by reference in its entirety) was developed by IBM®, Hewlett Packard Corporation® and Compaq Corporation® to increase performance of high bandwidth devices, such as Gigabit Ethernet standard and Fibre Channel Standard, and processors that are part of a cluster.

The iSCSI standard (incorporated herein by reference in its entirety) is based on Small Computer Systems Interface ("SCSI"), which enables host computer systems to perform block data input/output ("I/O") operations with a variety of peripheral devices including disk and tape devices, optical storage devices, as well as printers and scanners.

A traditional SCSI connection between a host system and peripheral device is through parallel cabling and is limited by distance and device support constraints. For storage applications, iSCSI was developed to take advantage of network architectures based on Fibre Channel and Gigabit Ethernet standards. iSCSI leverages the SCSI protocol over established networked infrastructures and defines the means for enabling block storage applications over TCP/IP networks. iSCSI defines mapping of the SCSI protocol with TCP/IP. The iSCSI architecture is based on a client/server model. Typically, the client is a host system such as a file server that issues a read or write command. The server may be a disk array that responds to the client request.

Serial ATA ("SATA") is another standard, incorporated herein by reference in its entirety that has evolved from the parallel ATA interface for storage systems. SATA provides a serial link with a point-to-point connection between devices and data transfer can occur at 150 megabytes per second.

Another standard that has been developed is Serial Attached Small Computer Interface ("SAS"), incorporated herein by reference in its entirety. The SAS standard allows data transfer between a host system and a storage device. SAS provides a disk interface technology that leverages SCSI, SATA, and fibre channel interfaces for data transfer. SAS uses a serial, point-to-point topology to overcome the performance barriers associated with storage systems based on parallel bus or arbitrated loop architectures.

The SAS specification addresses all devices in its domain by using a World Wide Name (WWN) address. The WWN is a unique 64-bit field that is allocated by IEEE to storage devices manufacturers.

In a SAS domain there could be up to 256 active devices. The devices could be of Initiator type or Target type. Initiator device initiates an Input/Output process (I/O) by sending a Command frame. The Target device completes an I/O by sending a Response frame. Any Initiator device may have up to 256 active I/O commands at a given time. Before any frame is sent, a connection is established between two SAS devices. A connection consists of an "Open Address" frame with a WWN field in it. On every Open Address, the receiving device compares the Open Address WWN to open I/O commands. Also, every I/O command may have multiple connections.

Typically, storage controllers use a Micro Controller that is 8-bit wide. The foregoing process of tracking connections using the 64-bit WWN addresses is time consuming. Therefore, there is a need for a system and method for efficiently manage connections and effectively use the WWN addresses.

SUMMARY OF THE INVENTION

In one aspect of the present invention, a method for managing frames entering or leaving a storage controller is provided. The method includes, comparing frame elements of incoming frames, including a unique World Wide Name (WWN) address with a WWN module entry; and if there is a match, updating a counter value for a connection between the storage controller and a device sending frames. A WWN index value is provided to a processor of the storage controller. The counter value is increased when a command frame is received and decreased when a command is executed and a response is sent to the device.

In yet another aspect of the present invention, a storage controller for transferring data between a host and a Serial Attached Small Computer Interface ("SAS") device is provided. The storage controller includes: a World Wide Name ("WWN") module that includes a table having plural entries, wherein each row includes a WWN address, an initiator tag value field, and an input/output counter value that tracks plural commands for a connection. The WWN module uses the WWN index value that represents an address of a row having plural entries.

The WWN module is a part of a link module that interfaces between a transport module and a physical module for transferring information. The WWN index value is smaller than the WWN address and can be read by a micro-controller or processor of the storage controller.

In yet another aspect of the present invention, a WWN module in a storage controller is provided. The WWN module includes, a table having plural entries, wherein each row includes a WWN address, an initiator tag value field, and an input/output counter value that tracks plural commands for a connection.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

Controller Overview

To facilitate an understanding of the preferred embodiment, the general architecture and operation of a controller will initially be described. The specific architecture and operation of the preferred embodiment will then be described with reference to the general architecture.

Figure 1A:
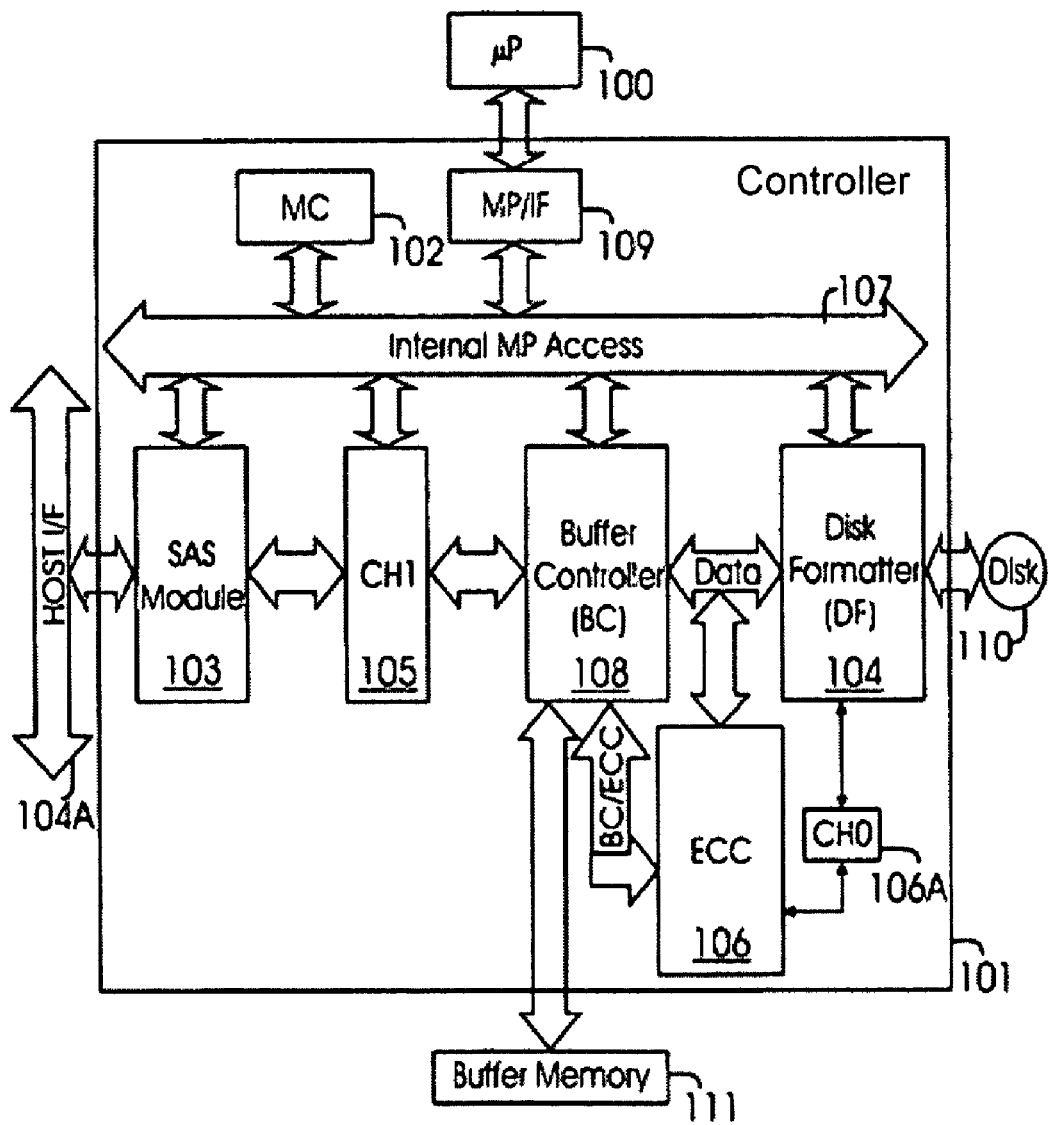
FIG. 1A shows an example of a storage drive system used with the adaptive aspects of the present invention.

FIG. 1A shows an example of a storage drive system (with an optical disk or tape drive), included in (or coupled to) a computer system. The host computer (not shown) and the storage device 110 (also referred to as disk 110) communicate via a port using a disk formatter "DF" 104. In an alternate embodiment (not shown), the storage device 110 is an external storage device, which is connected to the host computer via a data bus. The data bus, for example, is a bus in accordance with a Small Computer System Interface (SCSI) specification. Those skilled in the art will appreciate that other communication buses known in the art can be used to transfer data between the drive and the host system.

As shown in FIG. 1A, the system includes controller 101, which is coupled to buffer memory 111 and microprocessor 100. Interface 109 serves to couple microprocessor bus 107 to microprocessor 100 and a micro-controller 102 and facilitates transfer of data, address, timing and control information. A read only memory ("ROM") omitted from the drawing is used to store firmware code executed by microprocessor 100.

Controller 101 can be an integrated circuit (IC) that comprises of various functional modules, which provide for the writing and reading of data stored on storage device 110. Buffer memory 111 is coupled to controller 101 via ports to facilitate transfer of data, timing and address information. Buffer memory 111 may be a double data rate synchronous dynamic random access memory ("DDR-SDRAM") or synchronous dynamic random access memory ("SDRAM"), or any other type of memory.

Disk formatter 104 is connected to microprocessor bus 107 and to buffer controller 108. A direct memory access ("DMA") DMA interface (not shown) is connected to microprocessor bus 107 and to data and control port (not shown).

Buffer controller (also referred to as "BC") 108 connects buffer memory 111, channel one (CH1) logic 105, error correction code ("ECC") module 106 to bus 107. Buffer controller 108 regulates data movement into and out of buffer memory 111.

CH1 logic 105 is functionally coupled to SAS module 103 that is described below in detail. CH1 Logic 105 interfaces between buffer memory 111 and SAS module 103. SAS module 103 interfaces with host interface 104A to transfer data to and from disk 110.

Data flow between a host and disk passes through buffer memory 111 via channel 0 (CH0) logic 106A. ECC module 106 generates ECC that is saved on disk 110 during a write operation and provides correction mask to BC 108 for disk 110 read operation.

The Channels, CH0 106A, CH1 105 and Channel 2 (not shown) are granted arbitration turns when they are allowed access to buffer memory 111 in high speed burst write or read operations for a certain number of clocks. The channels use first-in-first out ("FIFO") type memories to store data that is in transit. Firmware running on processor 100 can access the channels based on bandwidth and other requirements.

To read data from device 110, a host system sends a read command to controller 101, which stores the read commands in buffer memory 111. Microprocessor 100 then reads the command out of buffer memory 111 and initializes the various functional blocks of controller 101. Data is read from device 110 and is passed to buffer controller 108.

To write data, a host system sends a write command to disk controller 101, which is stored in buffer 111. Microprocessor 100 reads the command out of buffer 111 and sets up the appropriate registers. Data is transferred from the host and is first stored in buffer 111, before being written to disk 110. Cyclic redundancy code ("CRC") values are calculated based on a logical block address ("LBA") for the sector being written. Data is read out of buffer 111, appended with ECC code and written to disk 110.

Figure 1B:
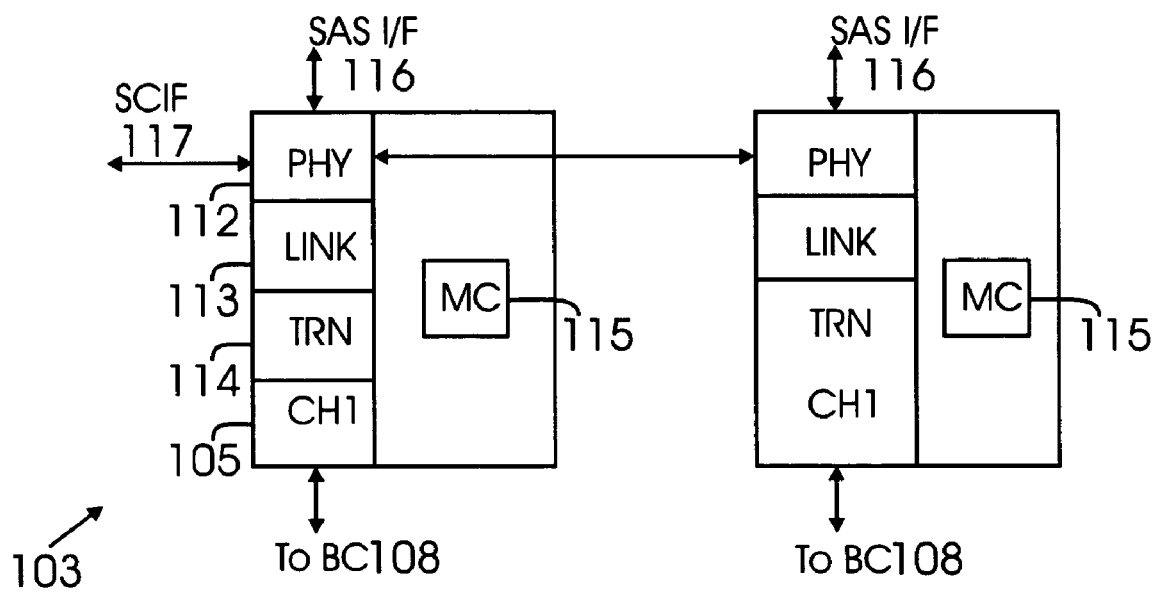
FIG. 1B shows a block diagram of a SAS module used in a controller, according to one aspect of the present invention.
Figure 1C:
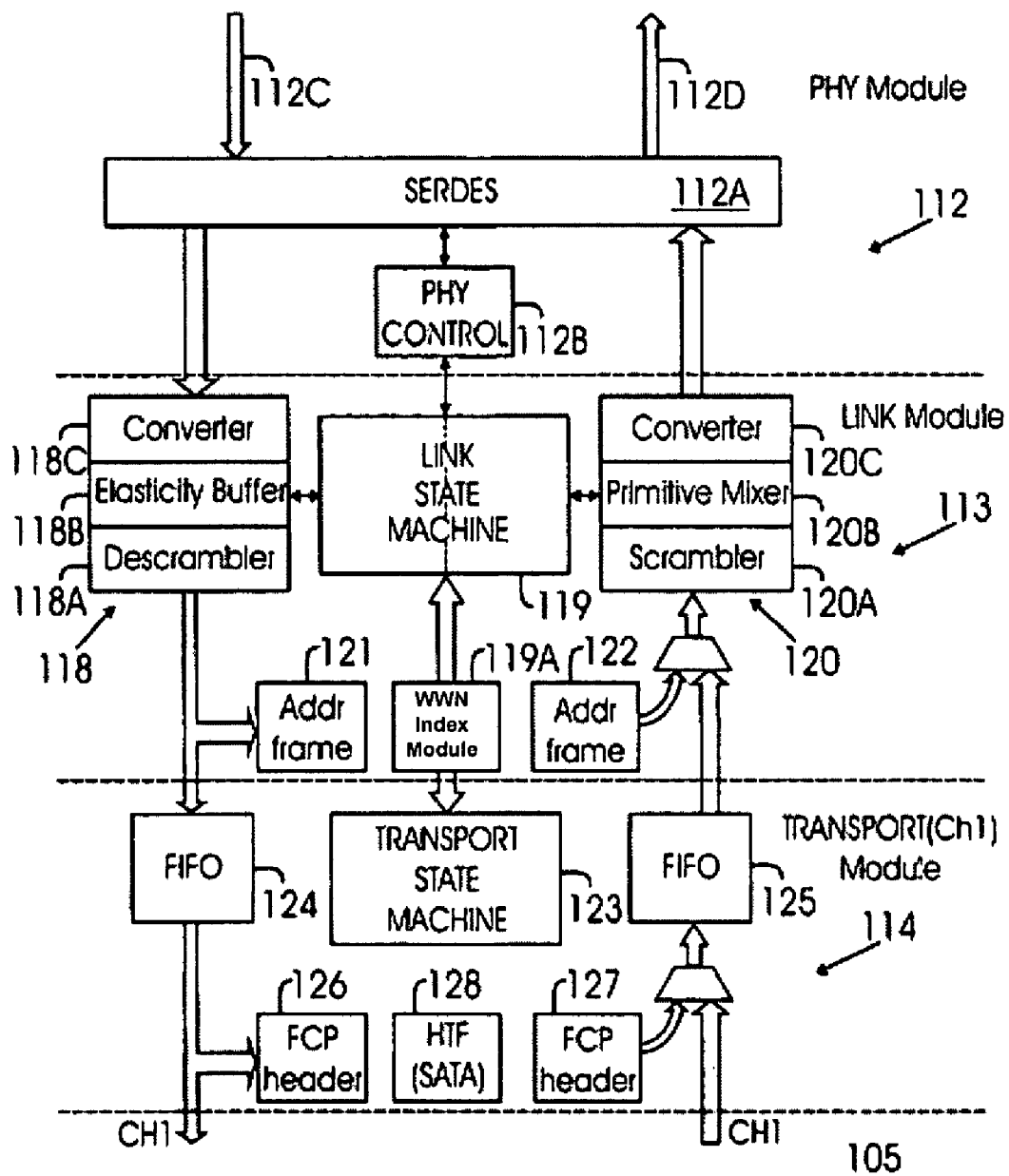
FIG. 1C shows a detailed block diagram of a SAS module, according to one aspect of the present invention.
Figure 1D:
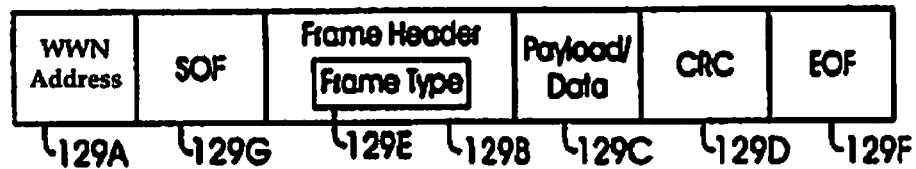
FIG. 1D shows a SAS frame that is received/transmitted using the SAS module according to one aspect of the present invention.

Frame Structure:

FIG. 1D shows a SAS frame 129 that is received/transmitted using SAS module 103. Frame 129 includes a WWW address 129A, a start of frame ("SOF") value 129G, a frame header 129B that includes a frame type field 129E, payload/data 129C, CRC value 129D and end of frame ("EOF") 129F. WWN address 129A is used for each open connection at a given time.

Also, a frame may be an interlock or non-interlocked, specified by field 129E. For an interlock frame, acknowledgement from a host is required for further processing, after the frame is sent to the host. Non-interlock frames are passed through to a host without host acknowledgement (up to 256 frames per the SAS standard).

SAS Module 103:

FIG. 1B shows a top level block diagram for SAS module 103 used in controller 101. SAS module 103 includes a physical ("PHY") module 112, a link module 113 and a transport module ("TRN") 114 described below in detail. A microcontroller 115 is used to co-ordinate operations between the various modules. A SAS interface 116 is also provided to the PHY module 112 for interfacing with a host and interface 117 is used to initialize the PHY module 112.

FIG. 1C shows a detailed block diagram of SAS module 103 with various sub-modules. Incoming data 112C is received from a host system, while outgoing data 112D is sent to a host system or another device/component.

PHY Module 112:

PHY module 112 includes a serial/deserializer ("SERDES") 112A that serializes encoded data for transmission (112D), and de-serializes received data (112C). SERDES 112A also recovers a clock signal from incoming data stream 112C and performs word alignment.

PHY control module 112B controls SERDES 112A and provides the functions required by the SATA standard.

Link Module 113:

Link module 113 opens and closes connections, exchanges identity frames, maintains ACK/NAK (i.e. acknowledged/not acknowledged) balance and provides credit control. As shown in FIG. 1C, link module 113 has a receive path 118 that receives incoming frames 112C and a transmit path 120 that assists in transmitting information 112D. Addresses 121 and 122 are used for received and transmitted data, respectively. WWN index module 119A is used for maintaining plural connections states, described below in detail.

Receive path 118 includes a converter 118C for converting 10-bit data to 8-bit data, an elasticity buffer/primitive detect segment 118B that transfers data from a receive clock domain to a transmit block domain and decodes primitives. Descrambler module 118A unscrambles data and checks for cyclic redundancy check code ("CRC").

Transmit path 120 includes a scrambler 120A that generates CRC and scrambles (encodes) outgoing data; and primitive mixer module 120B that generates primitives required by SAS protocol/standard and multiplexes the primitives with the outgoing data. Converter 120C converts 8-bit data to 10-bit format.

Link module 113 uses plural state machines 119 to achieve the various functions of its sub-components. State machines 119 includes a receive state machine for processing receive frames, a transmit state machine for processing transmit frames, a connection state machine for performing various connection related functions and an initialization state machine that becomes active after an initialization request or reset.

Transport Module 114:

Transport module 114 interfaces with CH1 105 and link module 113. In transmit mode, TRN module 114 receives data from CH1 105, loads the data (with fibre channel header (FCP) 127) in FIFO 125 and sends data to Link module 113 encapsulated with a header (129B) and a CRC value (129D). In receive mode, TRN MODULE 114 receives data from link module 113 (in FIFO 124), and re-packages data (extracts header 126 and 128) before being sent to CH 1105. CH1 105 then writes the data to buffer 111. State machine 123 is used to co-ordinate data transfer in the receive and transmit paths.

WWN Index Module 119A

Figure 2A:
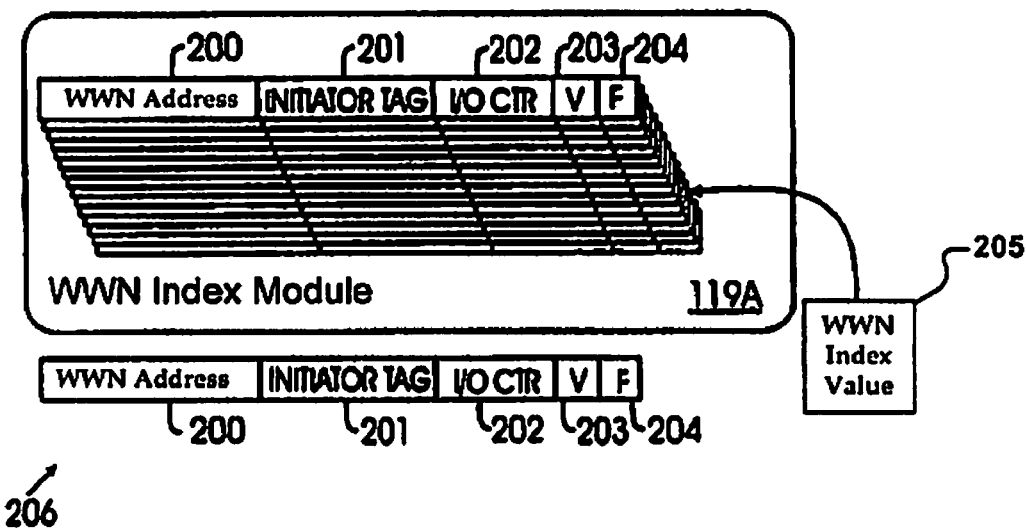
FIG. 2A shows a block diagram of a WWN Index module, according to one aspect of the present invention.

WWN Index module 119A, as shown in FIG. 2A, includes a table with "n" (where n is greater than 1) elements. WWN Index module 119A stores information about each open connection between storage controller 101 and a device/host. WWN Index module 119A has plural rows/layers. Each row (for example, row 206 in FIG. 2A) is referred to by its WWN index value (address value) 205. For example, row 206 includes a SAS address field (64 bit WWN address) 200, an Initiator Connection tag (16 bits) 201, an I/O counter (10 bits) 202, a single bit ("V") 203 to indicate the validity of an entry and a fresh (F) field 204 that indicates the latest row that is being serviced.

When an Open Address frame is received, the WWN address 129A (WWN address field) of the received frame is compared with the WWN address field (200) in module 119A. A successful comparison returns a WWN index value 205. This WWN index value 205 is provided to MC 115. Since the WWN index value 205 is an 8-bit field, MC 115 can handle it very efficiently.

It is noteworthy that the present invention is not limited to any particular size of module 119A or any of its entries. For example, WWN index value 205 is not limited to an 8-bit value or any other size.

If a WWN address of an Open Address frame is not recognized by module 119A entries and the first frame is of Command type, then a new entry (or row 206) is created and its I/O count 202 is set to one. The new row 206 is allocated a WWN index value 205, so that when a frame from the same source/connection arrives again, then module 119A can return the proper WWN index value (205) after the comparison.

For each frame crossing link module 113, the frame type is checked. If the frame is of Command type, the I/O counter of the active entry is incremented (increased) (202). If the frame is of Response type, the I/O count of the active entry is decremented (decreased). When the I/O count reaches zero, the valid bit 203 is reset and the entry becomes vacant.

Figure 2B:
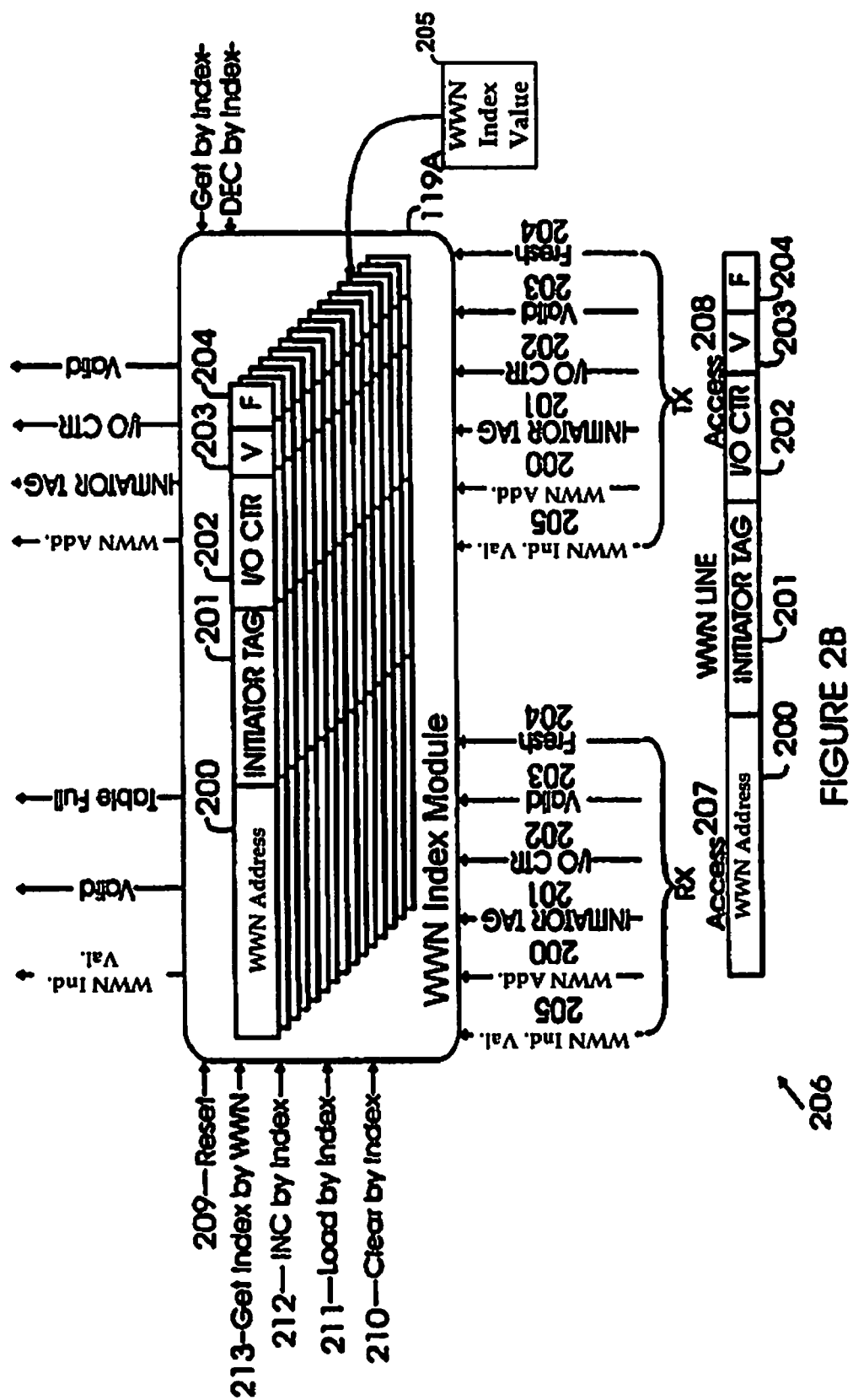
FIG. 2B shows yet another block diagram of a WWN Index module with plural commands, according to one aspect of the present invention.

FIG. 2B shows a detailed diagram of WWN module 119A with row 206. The various entries are loaded in rows based on receive access (path) 207 and transmit access (path) 208. Reset command 209 is used to reset module 119A. MC 102, MC 115 or MP 100 may issue the reset command.

"Get Index by WWN" 213 (or signal 213) allows searching of module 119A by WWN address 200 and/or Initiator Tag value 201. MC 115, MC 102 or MP 100 may use this function. If the "Get Index by WWN" function 213 finds an entry that matches a search term (for example, for an incoming frame), then the WWN index value 205 is returned with a "success" flag. If no match is found then a new entry is allocated and the new value is returned. If the table is full based on signal 213, then a "fail" flag is returned. A successful allocation causes the valid bit 203 to be set. The valid bit 203 is cleared fro an entry when the I/O counter value 202 reaches a certain value, for example, 0.

Signal/command "INC by Index" 212 is used to increment the index value 205. Also, MP 100 (or MC 102 or 115) may load a row (for example, 206) by using an index value 205 (by using "Load by Index" command 211). Using "Clear by Index" signal/command 210 clears entries in a row (206).

Figure 3A:
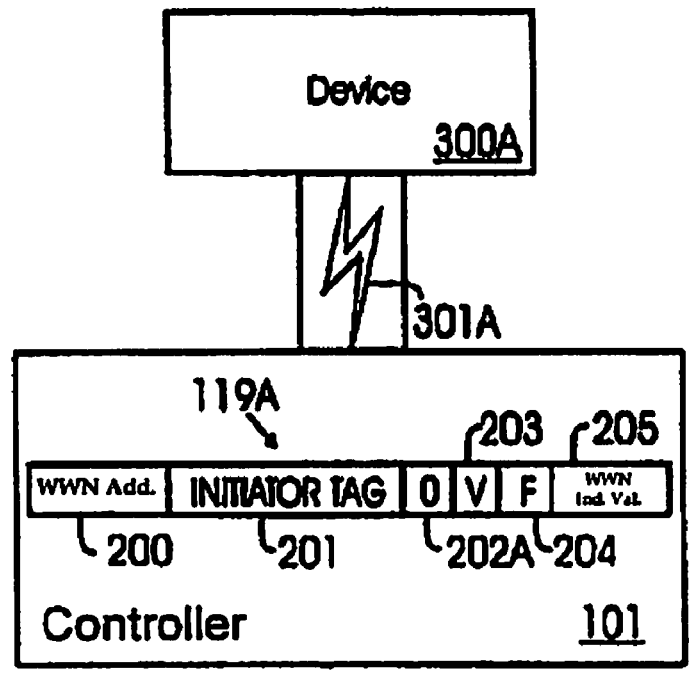
FIGS. 3A-3G illustrate the various process steps for implementing the WWN index module, according to one aspect of the present invention.
Figure 4:
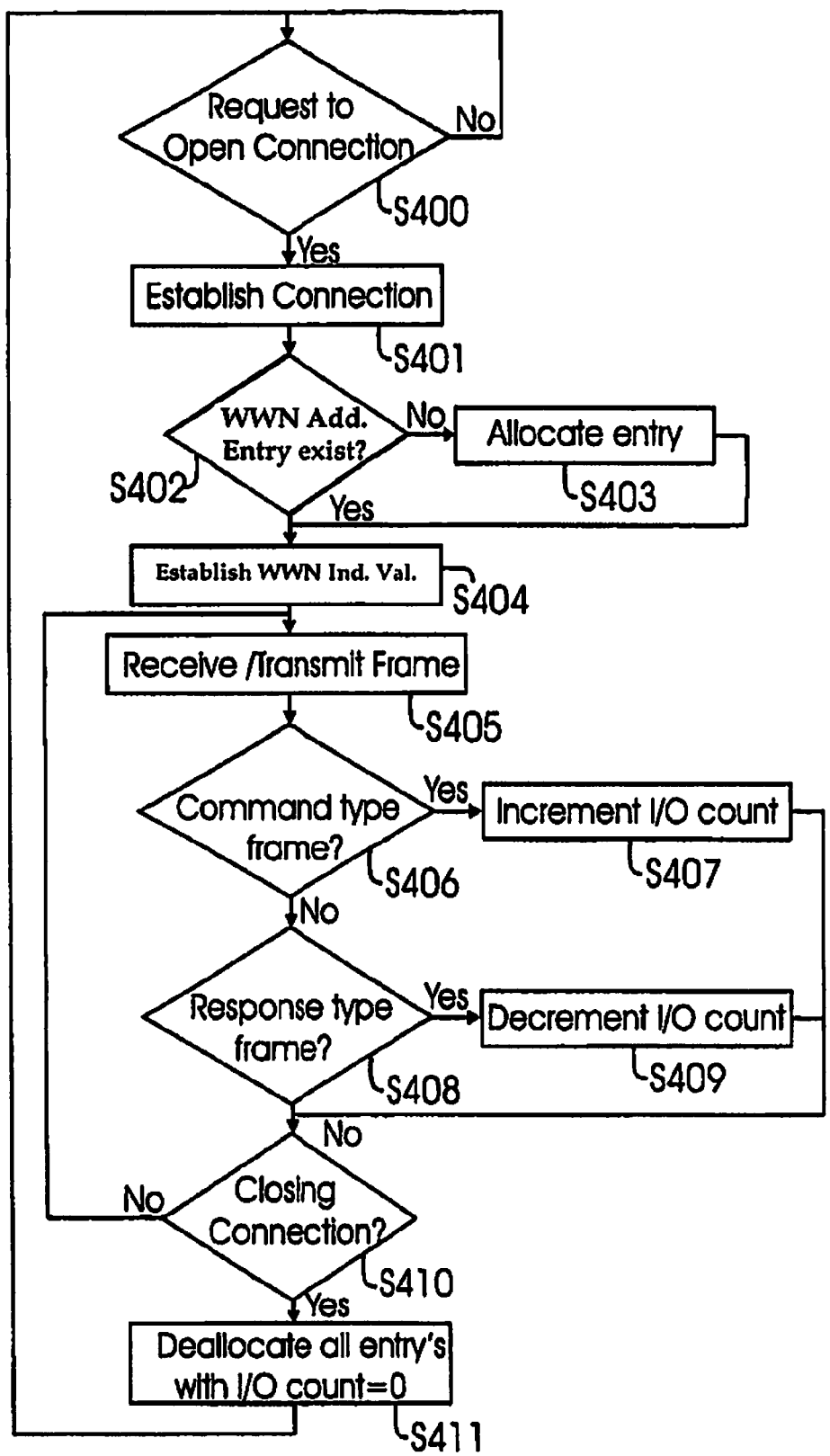
FIG. 4 is a process flow diagram for using the WWN index module, according to one aspect of the present invention.

FIG. 4 shows a flow diagram for using module 119A, according to one aspect of the present invention. Turning in detail to FIG. 4, in step S400, a request to open connection is made between a device (SAS peer device) 300A (FIG. 3A) and controller 101. If the request is accepted, then a connection is established in step S401, otherwise the process loops back to step S400 and waits. The connection is shown as 301A in FIG. 3A. At this stage the I/O counter value is zero (shown as 202A).

In step S402, the process determines if a WWN address entry exists. If yes, the process moves to step S404. If an entry does not exist in step S402, then an entry is created in step S403.

In step S404, a WWN index value is established for the entry (WWN index value 205).

In step S405, a frame is received/transmitted by controller 101.

In step S406, the process determines if a frame is of command type. If yes, then I/O counter value 202 is incremented (202B, FIG. 3B). If the frame is not of command type, then in step S408, the process determines if the frame is of response type. If the frame is of a response type, then the I/O counter value 202 is decremented (202B, FIG. 3F).

If the frame is not of a response type (in step S410), then the connection is closed in step S410 and in step S411, all the entries are de-allocated with the I/O counter value 202 cleared to zero (202A, FIG. 3A).

Figure 3B:
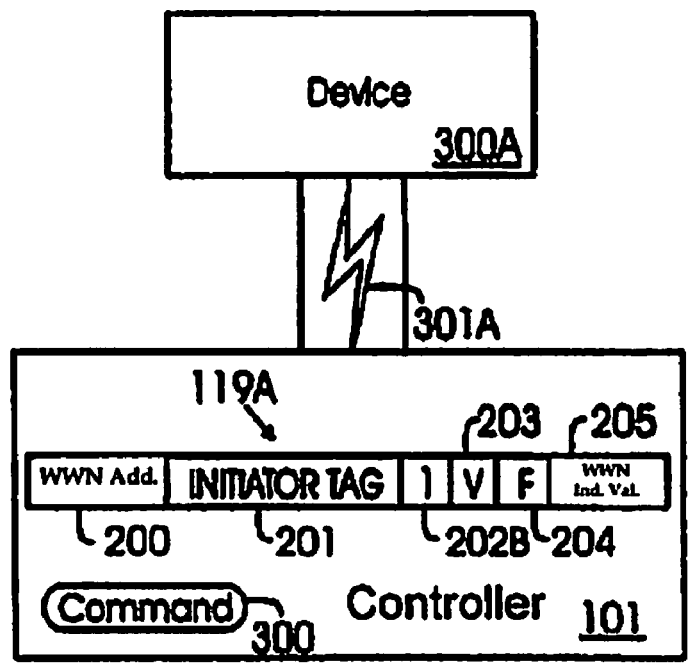

FIGS. 3A-3G illustrate the use of WWN module 119A, according to one aspect of the present invention. FIG. 3A shows that a connection 301A is established between controller 101 and device 300A. I/O counter value is zero, shown as 202A. FIG. 3B shows that a command 300 is received and thereafter, the I/O counter value is increased to 1 (shown as 202B).

Figure 3C:
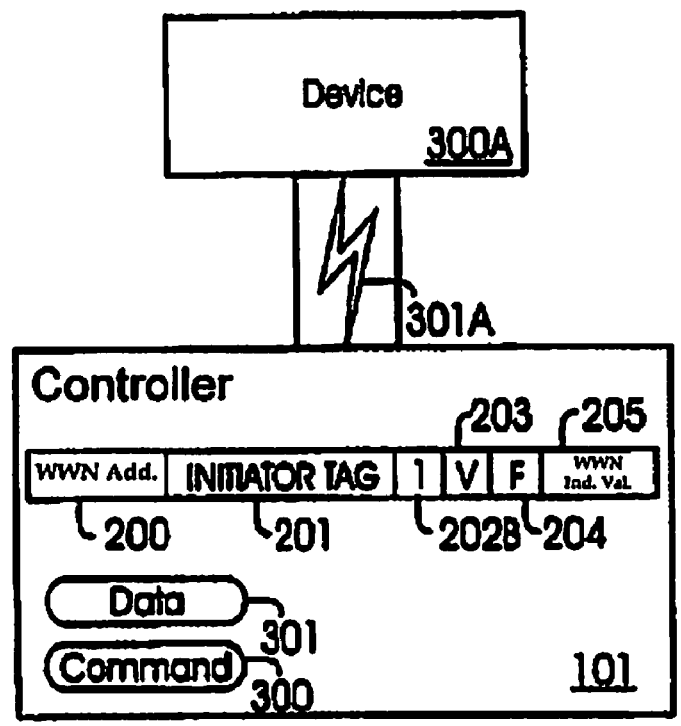
Figure 3D:
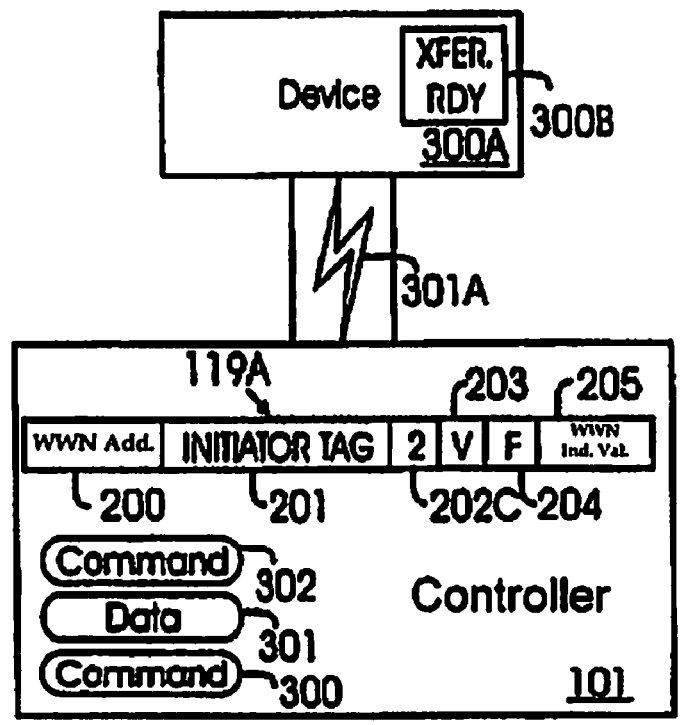

FIG. 3C shows that data 301 is received from device 300A and I/O counter value remains the same (i.e. 1). FIG. 3D shows that controller 101 receives another command 302 and that device 300A is ready for a transfer (shown as 300B). The I/O counter value is increased to 2, shown as 202C.

Figure 3E:
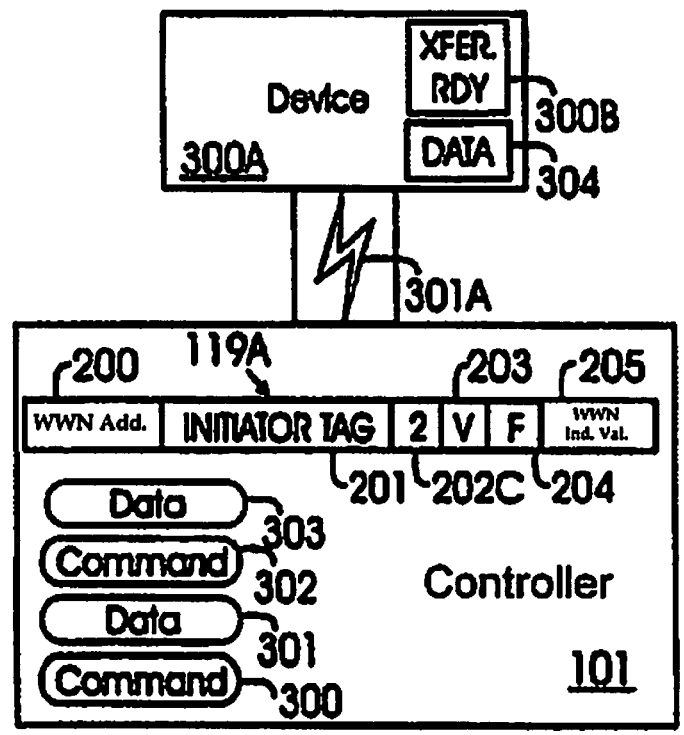

FIG. 3E shows that data 304 is received by device 300A via controller 101 and data 303 is received from device 300A. I/O counter value remains 2 (shown as 202C).

Figure 3F:
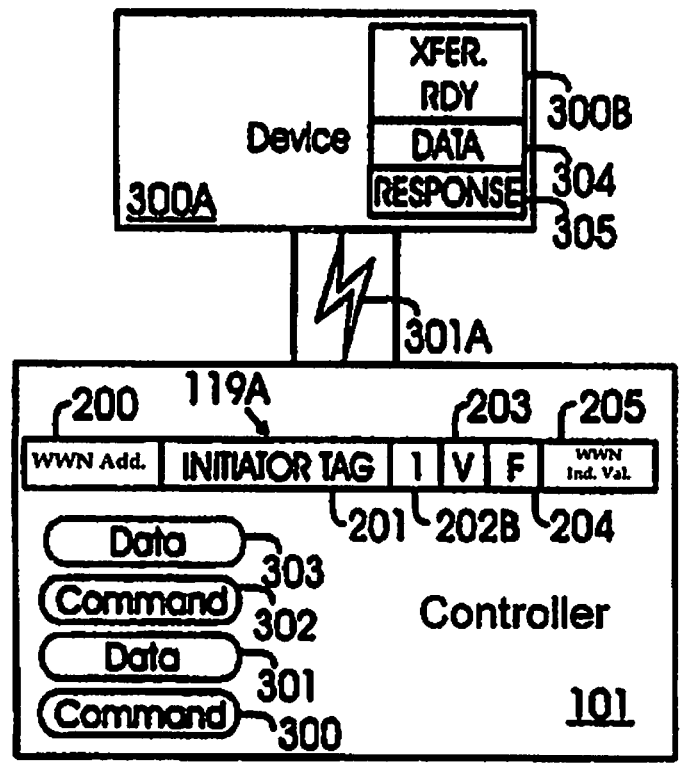

FIG. 3F shows that command 300 is complete and a response 305 is received by device 300A. I/O counter value is decreased to 1 and is shown as 202B.

Figure 3G:
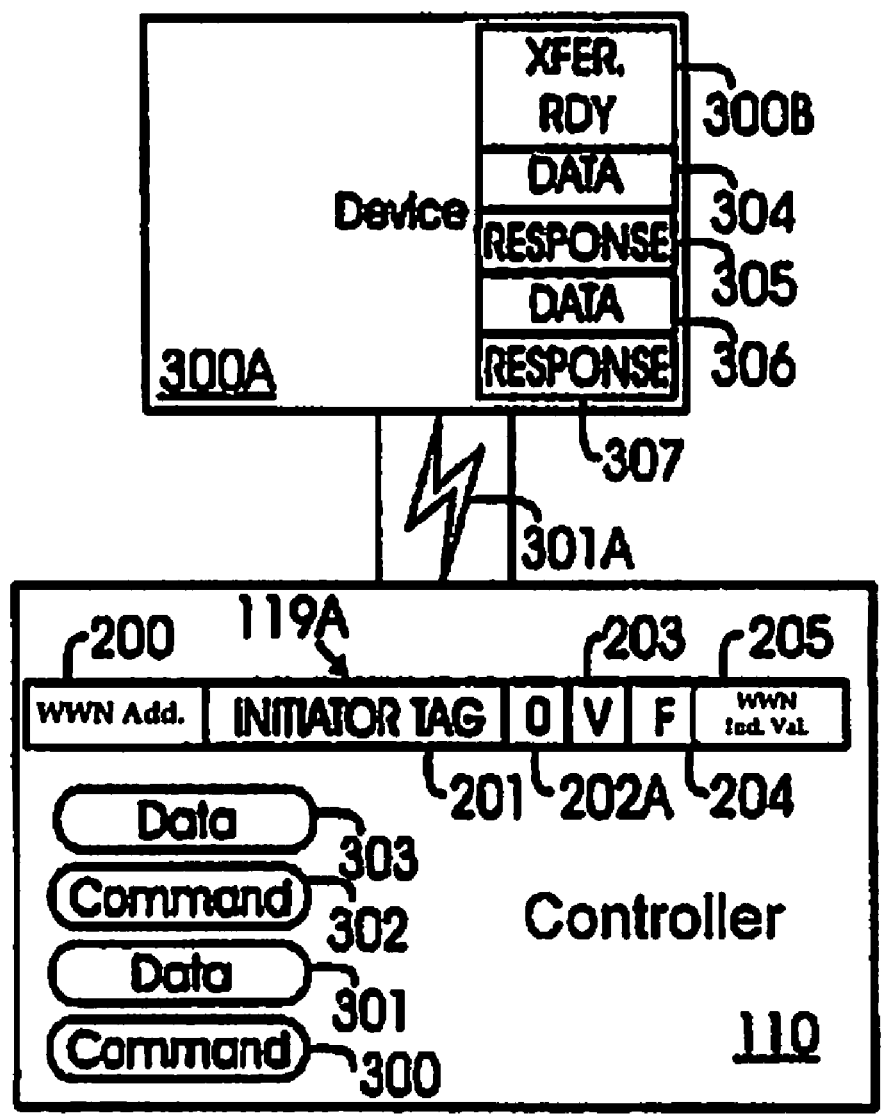

FIG. 3G shows that data 306 is received by device 300A via controller 101. After command 302 is complete, response 307 is sent to device 300A. Thereafter, the I/O counter value is decreased to zero, shown as 202A.

In one aspect of the present invention, a dynamic WWN module is provided that dynamically updates connection information. Also, the WWN module provides an easy to use index value that can be used by MC 115, MC 102 and MP 100.

Although the present invention has been described with reference to specific embodiments, these embodiments are illustrative only and not limiting. Many other applications and embodiments of the present invention will be apparent in light of this disclosure.

What is claimed is:

1. A storage controller that transfers data between a host and a storage device, the storage controller comprising:
    an interface module that provides an interface between a plurality of devices including the host and the storage controller; and
    an index module that:
        stores a plurality of entries that correspond to each of the plurality of devices;
        receives a frame of data including a world wide name (WWN) address;
        compares the WWN address to the plurality of entries; and
        generates an index value of the plurality of entries when the WWN address matches one of the plurality of entries.

2. The storage controller of claim 1, wherein the interface module includes a Serial Attached Small Computer Interface (SAS) module.

3. The storage controller of claim 1, wherein the storage controller communicates with one of the plurality of devices based on the match.

4. The storage controller of claim 1, wherein:
    the WWN address has a first length and the index value has a second length; and
    the second length is less than the first length.

5. The storage controller of claim 4, wherein the first length is 64 bits and the second length is 8 bits.

6. The storage controller of claim 1, wherein the index module includes a World Wide Name (WWN) module.

7. The storage controller of claim 1, wherein the index module updates a counter value based on the match.

8. The storage controller of claim 1, wherein the index module generates a new entry and a respective index value when the WWN address does not match one of the plurality of entries.

9. The storage controller of claim 1, wherein the index module stores the plurality of entries in a table including a plurality of rows.

10. A storage controller that transfers data between a host and a storage device, the storage controller comprising:
    interfacing means for providing an interface between a plurality of devices including the host and the storage controller; and
    indexing means for:
        storing a plurality of entries that correspond to each of the plurality of devices;
        receiving a frame of data including a world wide name (WWN) address;
        comparing the WWN address to the plurality of entries; and
        generating an index value of the plurality of entries when the WWN address matches one of the plurality of entries.

11. The storage controller of claim 10, wherein the interfacing means includes a Serial Attached Small Computer Interface (SAS) module.

12. The storage controller of claim 10, wherein the storage controller communicates with one of the plurality of devices based on the match.

13. The storage controller of claim 10, wherein:
    the WWN address has a first length and the index value has a second length; and
    the second length is less than the first length.

14. The storage controller of claim 13, wherein the first length is 64 bits and the second length is 8 bits.

15. The storage controller of claim 10, wherein the indexing means includes a World Wide Name (WWN) module.

16. The storage controller of claim 10, wherein the indexing means updates a counter value based on the match.

17. The storage controller of claim 10, wherein the indexing means generates a new entry and a respective index value when the WWN address does not match one of the plurality of entries.

18. The storage controller of claim 10, wherein the indexing means stores the plurality of entries in a table including a plurality of rows.

19. A method for managing frames of data in a storage controller, the method comprising:
providing an interface between a plurality of devices including a host and the storage controller;
storing a plurality of entries each corresponding to one of the plurality of devices;
receiving a frame of data including a world wide name (WWN) address;
comparing the WWN address to the plurality of entries; and
generating an index value of the plurality of entries when the WWN address matches one of the plurality of entries.

20. The method of claim 19, wherein providing the interface includes providing a Serial Attached Small Computer Interface (SAS) module.

21. The method of claim 19, further comprising communicating with one of the plurality of devices based on the match.

22. The method of claim 19, wherein:
the WWN address has a first length and the index value has a second length; and
the second length is less than the first length.

23. The method of claim 22, wherein the first length is 64 bits and the second length is 8 bits.

24. The method of claim 20, wherein the SAS module includes a World Wide Name (WWN) module.

25. The method of claim 19, further comprising updating a counter value based on the match.

26. The method of claim 19, further comprising generating a new entry and a respective index value when the WWN address does not match one of the plurality of entries.

27. The method of claim 19, further comprising storing the plurality of entries in a table including a plurality of rows.

28. The storage controller of claim 1, wherein each of the index values identifies a plurality of entries.

29. The storage controller of claim 1, wherein the plurality of entries for each of the plurality of devices includes an address, a tag, and a counter.

30. The storage controller of claim 1, wherein the plurality of entries for each of the plurality of devices include a device identifying address.

31. A storage controller that transfers data between a host and a storage device, the storage controller comprising:
an interface module that provides an interface between a plurality of devices including the host and the storage controller; and
an index module that:
stores a plurality of entries that correspond to each of the plurality of devices;
receives a frame of data including an address, that compares the address to the plurality of entries; and
generates an index value of the plurality of entries when the address matches one of the plurality of entries,
wherein:
the plurality of entries for each of the plurality of devices includes a counter; and
the counter indicates a number of open connections between the host and one of the plurality of devices.

32. The storage controller of claim 1, wherein the index module compares a received address with addresses of the plurality of entries and provide one of the index values when there is a match.

33. The storage controller of claim 1, wherein the plurality of entries comprise connection information associated with connections between the storage device and the plurality of devices.

34. A storage controller that transfers data between a host and a storage device, the storage controller comprising:
an interface module that provides an interface between a plurality of devices including the host and the storage controller; and
an index module that:
stores a plurality of entries that correspond to each of the plurality of devices;
receives a frame of data including an address, that compares the address to the plurality of entries; and
generates an index value of the plurality of entries when the address matches one of the plurality of entries,
wherein the plurality of entries for each of the plurality of devices includes at least one of a counter value, an initiator tag, a validity value, and a latest row serviced value.

35. The storage controller of claim 34, wherein the index module increments the counter value for a target device associated with the received frame when the address matches one of the plurality of entries.

36. The storage controller of claim 34, wherein the index module creates a new set of entries for a target device associated with the received frame when the address does not match one of the plurality of entries.

37. The storage controller of claim 36, wherein the index module initiates the counter value for a target device associated with the received frame when the address does not match one of the plurality of entries.

38. The storage controller of claim 34, wherein the counter value is increased when a command frame is received and decreased when a command is executed and a response is sent to the device.

39. The storage controller of claim 34, wherein the plurality of entries for each of the plurality of devices includes a counter value and at least one of the initiator tag, the validity value, and the latest row serviced value.

* * * * *